Sept. 10, 1929.  F. S. DICKINSON  1,727,755
METHOD OF PERMANENTLY SECURING METAL TO GLASS
Filed Jan. 15, 1925
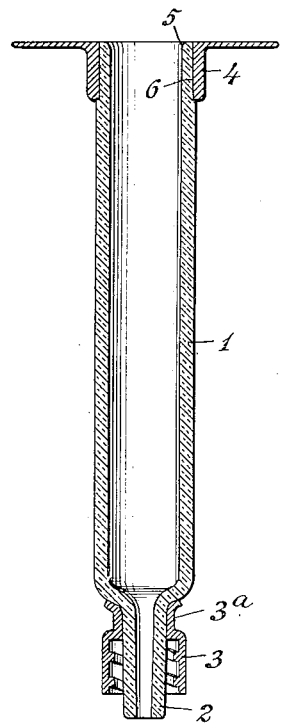
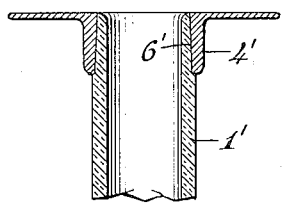
WITNESS
G. V. Rasmussen
INVENTOR
FAIRLEIGH S. DICKINSON
BY
ATTORNEYS Patented Sept. 10, 1929.

1,727,755

UNITED STATES PATENT OFFICE.

FAIRLEIGH S. DICKINSON, OF RUTHERFORD, NEW JERSEY.

METHOD OF PERMANENTLY SECURING METAL TO GLASS.

Application filed January 15, 1925. Serial No. 2,705.

This invention relates to the art of combining metal elements with glass elements in structures in which strains are developed tending to separate said elements and more particularly to that branch thereof which relates to the combination of metal units with the glass barrels of hypodermic syringes, and has for its object to provide a novel method whereby such metal elements or units may be permanently secured to the glass elements or specifically to the glass barrels of hypodermic syringes in a novel and reliable manner to efficiently withstand strains tending to separate said elements from each other. The invention will be fully described hereinafter and the features of novelty will be pointed out in the claims.

For the purposes of describing the invention and without intent to define the limits thereof, reference is had to the accompanying drawings which illustrate the invention as applied to glass hypodermic syringes and in which Fig. 1 is a longitudinal vertical section through metal articles therefor, illustrating the latter secured in place according to the present method; and Fig. 2 is a fragmentary sectional view of one end of the article shown in Fig. 1, disclosing a slightly modified structure to that shown in Fig. 1.

In order that the various steps of the method may be more clearly presented, a detail description of the construction of the article shown in the accompanying drawing will be given. In the drawing, 1 indicates a tubular member which, for instance, may be the glass barrel of a hypodermic syringe, said tubular member at one end merging into a nozzle 2 which may be cylindrical in form or which may have an exterior tapering surface as shown. A metallic member 3 is mounted on the nozzle 2 while a metallic ring 4 is mounted on the opposite end 5 of the tubular member 1.

According to the method embodying the invention, the internal diameter of the metallic element which is to be combined with the glass element is slightly less, in the normal condition of said metallic element, than the normal external diameter of said glass element. This internal diameter of the metallic element is in all cases dimensioned with respect to the normal external diameter of the glass element to exert a grip thereon without, however, developing a fracturing pressure on the glass element. Thus in the illustrated example the collar 3ª of the sleeve 3, whereby the latter is attached to the nozzle 2, is slightly smaller interiorly in its normal condition than the external dimension of that part of the nozzle 2 at which the connection is to be made. The latter is effected by heating the sleeve 3 or the collar 3ª thereof until its temperature has been raised appreciably above that of the nozzle 2 and the metal has accordingly been expanded to increase the interior dimension of said collar 3ª. The degree of temperature to which the collar 3ª is raised may vary, it being understood, however, that the metallic element is never heated to such an extent as to cause fracture of the glass element; it has been found that heating the metal element to approximately 150° F. where the glass element is at atmospheric temperature will produce satisfactory results. After the collar 3ª has been heated and expanded, it is placed upon the nozzle 2 at that point thereof where the connection is to be made, this being readily possible because of the temporary increase in the interior dimension of the collar 3ª. The parts are then allowed to cool so that the collar 3ª in contracting back to its original internal dimension becomes clamped upon the nozzle 2 so strongly as to resist removal to the point of breaking of the glass. It will be understood that the force exerted upon the glass by the collar 3ª or its equivalent after it has returned to its initial diameter, while sufficient to firmly fix the collar upon the nozzle 2 against separation therefrom, is not of such a character as to crush or injure the glass. In carrying out the method in its preferred form, the outer surface of the nozzle 2 is ground until it is approximately true or is otherwise prepared for the reception of the collar 3ª or its equivalent. The nozzle 2 may be of cylindrical outer form or its outer surface may be tapered as shown, the interior form of the collar 3ª or its equivalent, in any case, being of corresponding shape.

The surface 6 at the opposite end of the tubular member 1 may also be ground until it is approximately true and the bore of ring 4 likewise constructed in such a manner as to be approximately a true cylindrical bore of a diameter slightly less than the diameter of the surface 6. To attach the parts, the ring or other member 4 is heated and expanded in the manner set forth with respect to the collar 3ª, after which the ring 4 is forced onto the prepared surface 6; the parts are then also allowed to cool and in cooling the metal will shrink until it pinches or impinges against the surface 6 so strongly as to resist removal to the point of breaking of the glass.

In Fig. 2 a tubular member 1' is provided with a tapering ground surface 6'', said taper being comparatively slight but sufficient to permit the ring 4'' to be readily applied thereto. In the drawing, the taper has been exaggerated in order to clearly illustrate the construction. It will be, of course, understood that not only rings and members similar to members 3 and 4 may be applied to glass articles but other shaped members and also metallic encircling members may be applied to other articles besides tubular articles. It will be understood that the metal when heated, expands and, consequently, may be forced over the glass elements and for instance the prepared surface 6 or 6' thereof when in expanded condition. When the metal cools, it will contract and press against the prepared surface sufficiently to permanently connect the metal element with the glass element. It will thus be noted that in applying metal to glass permanently, a surface is provided on the glass article, which surface may, if desired, be prepared in a predetermined manner, and then the metal article is prepared with the bore slightly less in diameter than the aforesaid surface, after which the metal article is heated until it expands sufficiently to be readily forced over the prepared surface. After having been forced into position, the metal is allowed to become cool and thereby caused to shrink into position on the prepared surface.

What I claim is:

1. The method of permanently securing an encircling metal member to glass to resist strains exerted in axial directions and tending to separate said metal member from the glass, which consists in providing the metal bore with a bore of the same general contour as that of the glass at the securing region but normally of slightly less diameter than that of the glass at said region and dimensioned to expand, when moderately heated, to a slightly larger diameter than that of the glass at said region and, upon the subsequent prevalence of normal temperatures at said region, to exert a grip upon the glass surface of limited force less than that which develops a fracturing pressure on said glass, increasing the diameter of the metal member by heating it to a temperature moderately above normal temperature but less than that where the contact between the heated metal and the glass would tend to cause the latter to develop fractures, forcing the metal member while so heated over said glass and then allowing said metal member to shrink onto said glass by cooling.

2. The method of permanently securing an encircling metal member to glass, to enable it to withstand strains exerted in axial directions tending to separate the metal member from the glass, which comprises preparing a ground surface on the glass, providing the metal with a bore normally of the same general contour as that of the glass at the securing region but of slightly less diameter than said surface at said region and dimensioned to expand, when moderately heated, to a slightly larger diameter than that of the glass at said region and, upon the subsequent prevalence of normal temperatures at said region, to exert a grip upon the glass surface of limited force less than that which develops a fracturing pressure on said glass, increasing the diameter of the metal member by heating it to a temperature moderately above normal temperature but less than that where the contact between the heated metal and the glass would tend to cause the latter to develop fractures, forcing the metal member while so heated over the relatively cooler ground surface of the glass, and then allowing the metal to shrink onto said surface by cooling.

3. The method of permanently securing metal to glass to enable it to withstand strains tending to separate said metal and glass which comprises preparing a ground tapered surface on the glass, preparing a metal article with a bore of the same general contour as that of the glass at the securing region but of slightly less diameter than said ground surface at said region and dimensioned to expand, when moderately heated, to a slightly larger diameter than that of the glass at said region and, upon the subsequent prevalence of normal temperatures at said region, to exert grip upon the glass surface of limited force less than that which develops a fracturing pressure on said glass, increasing the diameter of the metal member by heating it to a temperature moderately above normal temperature but less than that where the contact between the heated metal and the glass would tend to cause the latter to develop fractures, forcing the metal article while so heated over said ground tapered surface until it tightly engages said surface, and finally permitting the metal article to cool and shrink upon said surface.

4. In the manufacture of hypodermic syringes, the method of permanently securing a metal fixture on the glass syringe barrel, which consists in grinding a portion of the outer surface of said barrel, providing the metal fixture with a bore of less diameter than that of said portion of the barrel and dimensioned to exert a grip thereon without developing a fracturing pressure on said glass, heating said fixture to temporarily increase its diameter beyond that of said portion of the barrel, forcing the fixture upon the barrel to engage said portion, and allowing said fixture to shrink on to said portion by cooling.

In testimony whereof I have hereunto set my hand.

FAIRLEIGH S. DICKINSON.